Seth P Carpenter's Improvement in Pruning Shears.
71975  Fig. 1.  PATENTED DEC 10 1867  Fig. 2.
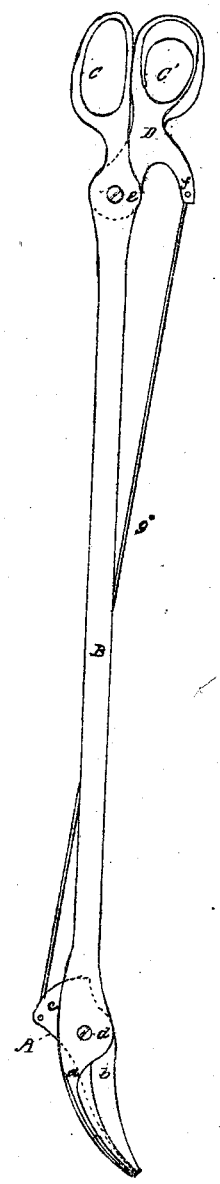
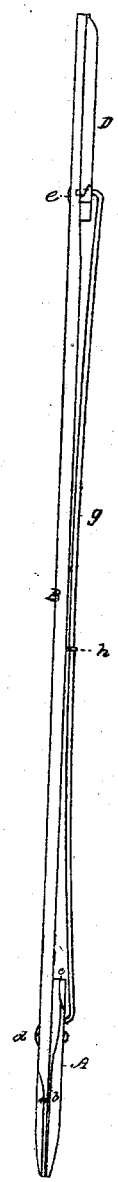
Witnesses
J. N. Piper
J. B. Snow
Seth P Carpenter
by his attorney
N. W. Lesly

United States Patent Office.

SETH P. CARPENTER, OF MILFORD, MASSACHUSETTS.

Letters Patent No. 71,975, dated December 10, 1867.

IMPROVEMENT IN PRUNING-SHEARS.

*The Schedule referred to in these Letters Patent and making part of the same.*

TO ALL PERSONS TO WHOM THESE PRESENTS MAY COME:

Be it known that I, SETH P. CARPENTER, of Milford, in the county of Worcester, and State of Massachusetts, have invented a new and useful Improvement in Pruning-Shears; and I do hereby declare the same to be fully described in the following specification, and represented in the accompanying drawings, of which—

Figure 1 denotes a side elevation, and

Figure 2 an edge view of them.

In such drawings, $a$ and $b$ are two blades, analogous to those of common shears or scissors, although instead of being straight, each of such blades is curved in manner as represented. The blade $b$ is the longer arm of a short lever, A, whose fulcrum, $d$, projects from the blade $a$. The said blade $a$ extends from a long shank or bar, B, which I usually make about two feet and six inches in length, and terminate in a flat ring or open handle, C. Near the junction of the said handle C and shank B, there is jointed to the latter a short lever, D, whose fulcrum, $e$, is projected from the shank. The lever D has an open handle, C', and it also has an arm, $f$, extended from it in manner as represented. To the said arm $f$, and also to the shorter arm $c$, of the shear-lever A, a rod, $g$, is jointed, such arm being extended obliquely across the shank B and through a staple, $h$, projecting therefrom at or near its centre.

In using the implement, the hand of the user is to be inserted within the handles C C', as it is customary for a person to apply his hand to the handles of tailors' shears. The lever D may be moved on its fulcrum by the thumb, and will correspondingly and simultaneously move the lever C, so as to open or close the blades of the pruning-shears as occasion may require. These shears are particularly intended for pruning the runners of strawberry-vines, and while being so used they are to be held by one hand, with the blade $a$ resting on the ground. They are to enable the user, while at work with them, to stand in an upright position, which he cannot do with ordinary shears, which require him to stoop, and thus soon fatigue him in the back. They will also be found very serviceable for pruning grape-vines.

I am aware that shears have been attached to a pole, and operated by suitable mechanism combined therewith; therefore I do not claim such.

I claim as my invention—

The new or improved manufacture of pruning-shears, as hereinbefore described, that is, as composed of the blades $a$ $b$, the lever C, the long shank B, the lever D, the open handles C C', the arm $f$, and the rod $g$, arranged and combined in manner, and for the purpose, and to operate substantially as specified.

SETH P. CARPENTER.

Witnesses:
R. H. EDDY,
F. P. HALE, Jr.